Patented Mar. 6, 1934

1,950,085

UNITED STATES PATENT OFFICE 1,950,085

COMPOSITIONS OF MATTER AND METHOD AND STEPS OF MAKING AND USING THE SAME

Mortimer T. Harvey, East Orange, N. J., assignor to The Harvel Corporation, a corporation of New Jersey No Drawing. Application October 17, 1930, Serial No. 489,484

4 Claims. (Cl. 202—3)

The present invention relates generally, to products obtained by fractionally distilling cashew nut shell liquid, to the residues from such distillations, and to methods and steps of making such distillations and of treating intermediate products thereof to secure the products of the invention. The products of the invention are useful as and in the arts of germicides, colors, dyes, perfumes, flavors, solvents and plasticizers for cellulose esters, and bases for the several ones of these products, and for use in the arts generally.

Raw cashew nut shell liquid is composed of about ninety per cent of anacardic acid and about ten per cent of cardol. By the distilling steps of the present invention these materials are cracked or dissociated to form comparatively large molecule phenols, water and other materials. The phenols produced are non-toxic, can be separated from the other products of the distillation and have various other characteristics and the other products have use applications, as hereinafter set forth.

Methods and steps for producing all of the above products will be given below, but at the first my disclosure will be directed more particularly to the making of germicides with other products or intermediates therefor.

It is well known that raw cashew nut shell liquid has been used for many years, particularly in India, for purpose of protecting furniture, timbers and so on against certain species of ants and other insects which devour wood, but the raw cashew nut shell liquid does not have the germicidal qualities of the products of the invention and has disadvantages not present in the germicides of the present invention.

I have discovered that a valuable preparation having a high germicidal coefficient can be made from cashew nut shell liquid by the method and steps hereinafter fully set forth. The exact composition of these preparations have not yet been determined. These compounds however are much stronger in germicidal effect than phenol and a sample mixture comprising 30% of a product of the invention and 70% of water gave a phenol coefficient of 5.25 in a germicidal test on bacilus typhosus made with the 1921 modification of Rideal-Walker method.

The details of this particular test are given in the table below. The germicidal product referred to in the above paragraph is denoted as "disinfectant" in the table below and is compared with phenol.

GERMICIDAL TEST

RIDEAL-WALKER METHOD (1921 MODIFICATION)

Organism—*B. typhosus* (Hopkins)

Age of culture—24 hours at 37° C.

*Medium-Rideal-Walker beef extract broth*

Organic matter—none

Temperature of Medication—18° C.

Dose=0.5 cc. of filtered culture to 5 cc. of diluted disinfectant

Subcultures=One 4 mm. loopful to 10 cc. of broth

The subcultures were incubated 48 hours at 37° C. with the following results

| Sample | Dilution | Minutes of exposure to disinfectant |||||| 
|---|---|---|---|---|---|---|---|
| | | 2½ | 5 | 7½ | 10 | 12½ | 15 |
| Disinfectant (30% solids) | 1:300 | Minus | Minus | Minus | Minus | Minus | Minus. |
| | 1:350 | do | do | do | do | do | Do. |
| | 1:400 | do | do | do | do | do | Do. |
| Received Sept. 29, 1930 | 1:450 | Plus | do | do | do | do | Do. |
| | 1:500 | do | Plus | do | do | do | Do. |
| | 1:550 | do | do | Plus | do | do | Do. |
| | 1:600 | do | do | do | Plus | Plus | Plus. |
| Phenol | 1:90 | do | Minus | Minus | Minus | Minus | Minus. |
| | 1:100 | do | Plus | Plus | do | do | Do. |

Phenol coefficient—$\frac{450}{90}$ $\frac{550}{100}$=5.25

For purposes of example two methods of making the germicidal preparations of the invention are given below, identified respectively as method A and method B. In both these methods the cashew nut shell liquid used was given a preliminary heating at about 450° F. to drive off moisture contained therein whereby frothing would be avoided in heating at the higher temperatures shown in the disclosure of these methods. Hereinafter the cashew nut shell liquid which has been given the preliminary heating is referred to as dehydrated cashew nut shell liquid or the dehydrated liquid.

Method 1—In one method of the invention a quantity of the dehydrated liquid was distilled from a copper container through an iron pipe, until a residue was left which was approximately 50% of the weight of the original amount of dehydrated oil used. A thermometer used to determine the temperature had its bulb at the bottom of an iron tube which latter had its inner end closed and its outer open end sealed at an opening in the cover of the copper container. A quantity of cylinder oil was placed in the tube containing the thermometer to immerse the thermometer bulb for the purpose of protecting the latter against sudden changes in temperature. The distillation started with a few drops at about 580° F.; at 700° the drops of distillate commenced to flow faster; and the flow of distillate reached approximately maximum at about 720° F. The bulk of distillate came over between 720° and 730° F. The total distillate except a water solution "B" which separates out at the bottom, is identified here as distillate "A" for convenience in setting forth the methods of the invention.

The residue, "C", is a tarry looking substance which I have found to be very black, is oil soluble; and is valuable for use in japans, paints, enamels and the like because of the above given qualities and particularly because it gives a real black color when used with vehicles such as linseed oil, China-wood oil and cashew nut shell liquid. This oil soluble black residue and materials made therefrom will be claimed in a divisional patent application drawn thereto.

To 100 parts of distillate "A" were added about 20 parts of powdered caustic soda, by weight, and placed in a glass container under a reflux condenser, and heated for about 2½ hours at about 300° F.

The refluxed liquid was distilled at about 300° F. and the distillate "D" and residue "E" saved. Distillate "D" is useful as a solvent for cellulose acetate and cellulose nitrate lacquers, and oil paints and varnishes.

The residue "E" is then added to an equal volume of water for removing water solubles formed during or remaining after the reaction with caustic under the reflux. This mixture was separated in a separatory funnel into water solution "F" and liquid "G". The solution "F" is the "disinfectant" set forth in the Rideal-Walker test table given above.

The liquid "G" is a base for making dyes, perfumes and flavors by various reactions such as, nitration, reduction, and reactions with metals.

Method 2—A second method differs from Method 1 in that the entire distillate at the beginning, that is, distillate "A" and water solution "B", was placed in a separatory funnel and let stand to allow distillate "A" and the water solution "B" to separate more fully. Distillate "A" is then distilled at a range of about 140° to 290° F. to secure a liquid distillate "H" and liquid residue "I". To 100 parts of residue "I" were added about 15 parts by weight of powdered caustic soda and the mixture heated for about 2½ hours at about 300° F. under a reflux condenser, after which it was allowed to cool and about an equal volume of water was added and let stand in a separatory funnel. Separation took place into two layers consisting of an upper liquid "K" corresponding to liquid "G" above and a lower water solution "L", which latter is a germicide like solution "F" of Method 1 above.

Method 3—A third method or variation is to distill distillate "A", of Methods 1 or 2, in a range of about 300° to 460° F. to secure a residue "M" and a distillate "N". The residue "M" corresponds to liquid "G" and liquid "K", above, and is suitable for the purposes given therefor. Distillate "N", when treated with caustic or alcohol, to form a liquid "O", is a germicide and corresponds to solution "F" and solution "L" above.

Solution "F", solution "L" and liquid "O" are suitable for use for hygienic purposes and for general disinfection of walls, floors and other places, generally with dilution with water, with or without the addition of soda, soaps, alcohol or the like to aid in making a solution. Also, for hygienic and other purposes, the caustic can be entirely removed or the amount decreased, by neutralizing with an acid such as hydrochloric and removing the neutralized germicide from the water solution of caustic. The neutralized germicide when diluted with alcohol, or with water with the addition of small amounts of caustic, and/or alcohol to aid in solution is again for general use.

In the above Methods 1, 2 and 3 caustic materials other than caustic soda can be used for refluxing, for example, caustic potash, soda ash, sodium bicarbonate, ammonium carbon, ammonium hydroxide, lime, rosin or soya bean soaps and other soaps and so on. Also in place of using solid caustic material, caustic solutions can be used. These materials can also be used in preparing solutions or dispersions of the germicide for use. For this latter purpose gum arabic, agar-agar and furfuraldehyde can be used. A notable characteristic of the germicide of the invention, for example, solution "F", solution "L", and liquid "O", is that it is not toxic, in remarkable contrast to phenol and cresols which are well known to be highly toxic.

From the above descriptions of the germicide of the present invention and of the methods and steps in producing the same, it appears that the germicide of the invention is that part of cashew nut shell liquid distillate which in miscible with water in the presence of caustic.

Having thus described my invention, what I claim is:

1. The method which comprises distilling cashew nut shell liquid at atmospheric pressure in a temperature range between about 580° F. and about 750° F., and condensing the distillate.

2. The method which comprises distilling cashew nut shell liquid at atmospheric pressure in a temperature range between about 650° F. and about 750° F., and condensing the distillate.

3. The method which comprises heating cashew nut shell liquid at atmospheric pressure and within the temperature range of about 650° F. to about 750° F. and removing from the resulting product phenolic material which will distill in a temperature range of about 300° F. to about 460° F.

4. A non-toxic germicidal phenolic material obtainable as a distillate by cracking cashew nut shell liquid at atmospheric pressure in a temperature range between about 580° F. and 750° F. and having a boiling point in the range of about 300° F. to 400° F.

MORTIMER T. HARVEY.